(12) United States Patent
Lawson et al.

(10) Patent No.: US 8,256,680 B2
(45) Date of Patent: Sep. 4, 2012

(54) IMAGE ENGINE WITH MULTIPLE DRIVERS

(75) Inventors: Eric Lawson, Auburn, NY (US);
Malcolm Gillespie, Marcellus, NY (US);
Michael Sperduti, Auburn, NY (US);
Charles Barber, Fayetteville, NY (US)

(73) Assignee: Hand Held Products, Inc., Skaneateles Falls, NY (US)

( * ) Notice: Subject to any disclaimer, the term of this patent is extended or adjusted under 35 U.S.C. 154(b) by 429 days.

(21) Appl. No.: 12/570,071

(22) Filed: Sep. 30, 2009

(65) Prior Publication Data

US 2011/0078706 A1    Mar. 31, 2011

(51) Int. Cl.
*G06K 7/10* (2006.01)
(52) U.S. Cl. .............................. 235/472.01; 235/462.45
(58) Field of Classification Search ............. 235/472.01, 235/462.45, 462.41, 462.11, 462.24
See application file for complete search history.

(56) References Cited

U.S. PATENT DOCUMENTS

2008/0121711 A1    5/2008   Blumer et al.

*Primary Examiner* — Edwyn Labaze
(74) *Attorney, Agent, or Firm* — Hiscock & Barclay, LLP

(57) ABSTRACT

A portable data terminal including a processor, a plurality of system resources, data storage means configured to store a plurality of program instructions, the program instructions including at least one hardware device driver and at least one scan driver, an image engine including a host interface, an imager in communication with the host interface, an illumination assembly and an aimer assembly wherein the illumination and aimer assemblies are controlled by the processor according to instructions stored in the data storage means, and a data structure having at least one data type and at least one value, the data structure being defined by the scan driver wherein the scan driver is configured to modify the data structure and transfer at least one of the values of the data structure to the hardware device driver in order to manage acquisition and release of a system resource by the image engine.

13 Claims, 3 Drawing Sheets

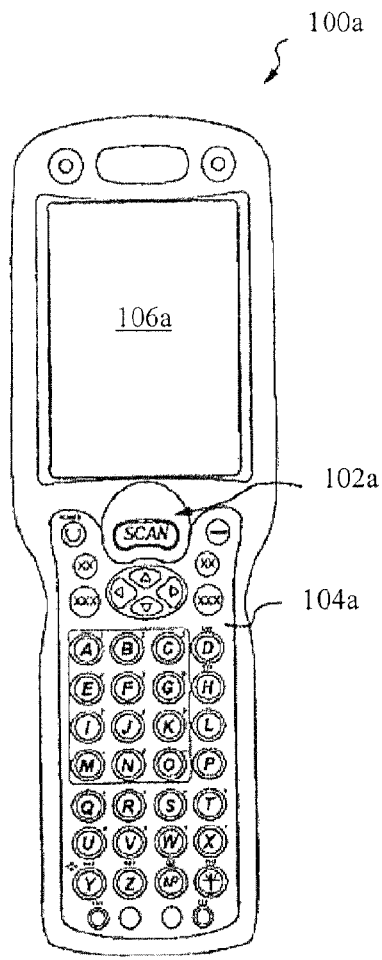
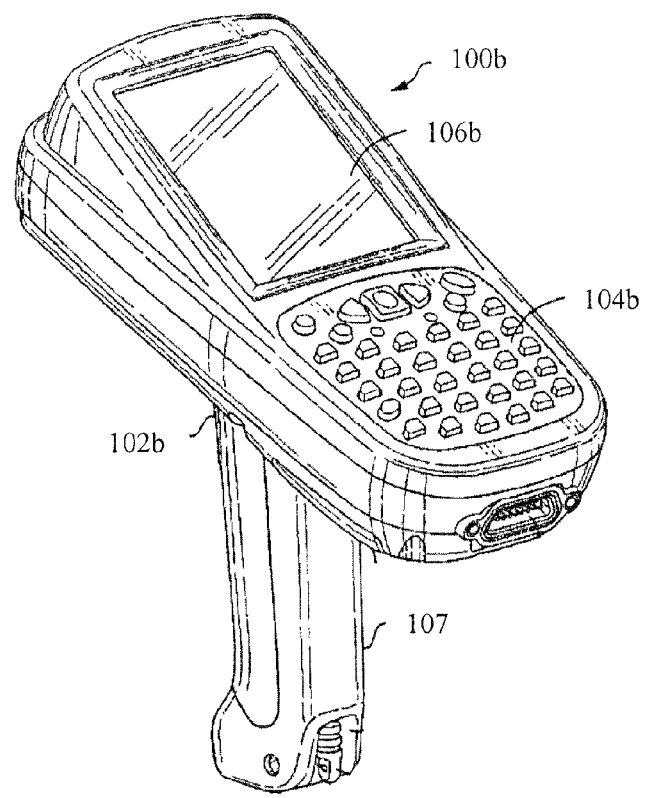
Fig. 1A (Prior Art)
Fig. 1B (Prior Art)

IMAGE ENGINE WITH MULTIPLE DRIVERS

TECHNICAL FIELD

The present invention relates to indicia reading devices and more particularly, to indicia reading devices having one or more image capture devices.

BACKGROUND INFORMATION

Indicia reading devices such as optical indicia readers, scanners, bar code scanners, and portable data terminals (PDTs), for example, typically read data represented by printed indicia such as symbols, symbology, and bar codes, for example. One type of symbol is an array of rectangular bars and spaces that are arranged in a specific way to represent elements of data in machine readable form. Optical indicia reading devices typically transmit light onto a symbol and receive light scattered and/or reflected back from a bar code symbol or indicia. The received light is interpreted by an image processor to extract the data represented by the symbol. Laser indicia reading devices typically utilize transmitted laser light. One-dimensional (1D) optical bar code readers are characterized by reading data that is encoded along a single axis, in the widths of bars and spaces, so that such symbols can be read from a single scan along that axis, provided that the symbol is imaged with a sufficiently high resolution.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures.

Many other classes of bar code symbologies and/or indicia have been known and are in widespread use including, for example, PDF417, MicroPDF417, MaxiCode, Data Matrix, QR Code, Aztec, Aztec Mesas, Code 49, EAN-UCC Composite, Snowflake, Dataglyphs, Code 39, Code 128, Codabar, UPC, EAN, Interleaved 2 of 5, Reduced Space Symbology, Code 93, Codablock F, and BC412, Postnet, Planet Code, British Post, Canadian Post, Japanese Post, OCR-A, OCR-B, Code 11, UPC, EAN, MSI, and Code 16K. Further, indicia may be represented by printed indicia, symbol indicia, biogenic/biometric indicia or any information extracted from a captured image.

Conventionally, a reader, whether portable or otherwise, includes a central processor which directly controls the operations of the various electrical components housed within the bar code reader. For example, the central processor controls detection of keypad entries, display features, wireless communication functions, trigger detection, and bar code read and decode functionality. More specifically, the central processor typically communicates with an illumination assembly configured to illuminate a target, such as a bar code, and an imaging assembly configured to receive an image of the target and generate an electric output signal indicative of the data optically encoded therein. The imaging and illumination assemblies, along with at least a microcontroller and an interface, are often sold as an OEM component referred to as an image engine such as the 5x00 line of image engines offered by Hand Held Products, Inc. Although image engines have sufficient resolution, and are generally well-designed for the purpose of reading printed indicia, increasingly, OEM image engines are being incorporated into PDTs, and other devices, already having at least one general purpose camera/imager, having relatively high resolution, integrated in the platform.

Accordingly, there is a need for a system and method for managing contention issues, with respect to system resources, of PDTs containing multiple imagers such as, for example, host/platform PDTs with a general purpose camera having a later integrated image engine.

BRIEF DESCRIPTION OF THE DRAWINGS

The present invention is disclosed with reference to the accompanying drawings, wherein:

FIG. 1 is a plan view and a side perspective view of two prior art PDTs.

Figure 2:
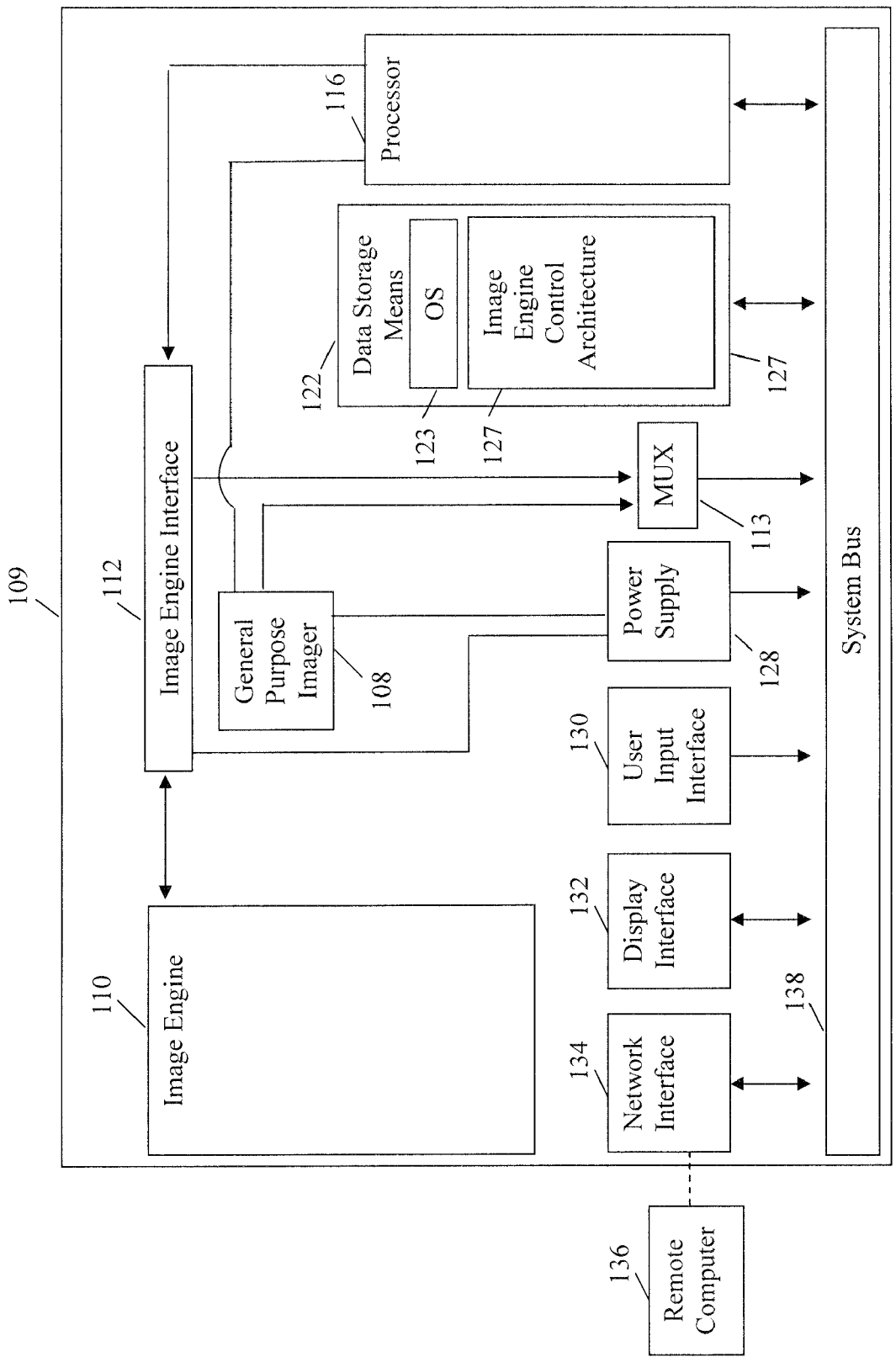
FIG. 2 is a block schematic diagram of an exemplary PDT according to the present invention.

It will be appreciated that for purposes of clarity and where deemed appropriate, reference numerals have been repeated in the figures to indicate corresponding features.

DETAILED DESCRIPTION

Referring to FIGS. 1A and 1B, two prior art PDTs 100 for reading/scanning printed indicia are shown as including a keypad 104, scan/trigger button 102, and display 106 such as an LCD or OLED display, for example. The PDT 100*b* shown in FIG. 1B further includes a handle portion 107. Although the present invention is described with respect to a PDT, the invention can be utilized in any mobile device, mobile computer, or personal data assistant, for example, having multiple imagers.

A block schematic diagram of an exemplary PDT 109 according to the present invention having a general purpose imager and an image engine is shown in FIG. 2. The PDT 109 also includes one or more programmable control means such as a processor 116 and/or a microprocessor such as a VLSI integrated circuit microprocessor. The processor 116 is configured to receive, output and process data, including image/pixel data, in accordance with program instructions stored in a data storage means 122 such as a local, network-accessible, removable and/or non-removable memory, such as RAM, ROM, and/or flash. The processor 116 is further configured to retrieve program instructions from the data storage means in order to operate the general purpose imager 108, communicate with a system bus 138, and facilitate interaction between the display interface 132 and the display 106, the user input interface 130 and the keypad and/or trigger 104/scan 102 buttons, and the network interface 134 and a remote computer 136 or other device, among other operations. The network interface 134 can be an RS-232, RS-485, USB, Ethernet, Wi-Fi, Bluetooth, IrDA and/or Zigbee interface, for example.

Figure 3:
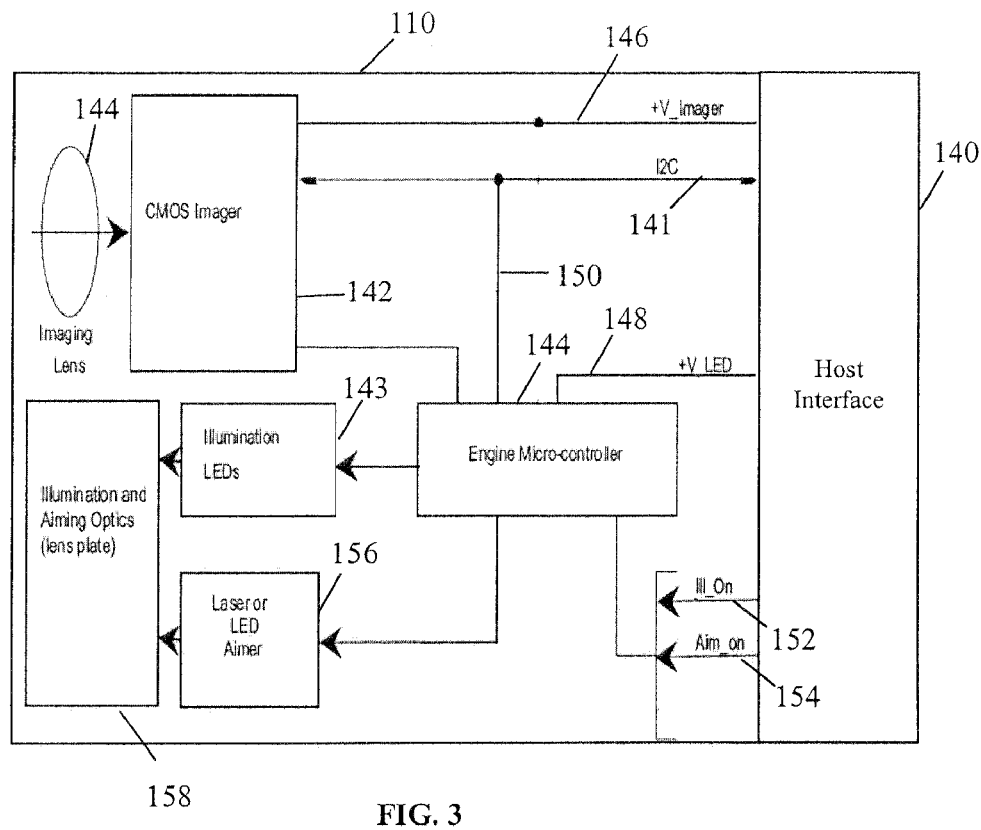
FIG. 3 is a block schematic diagram of an exemplary image engine according to the present invention.

A PDT 109 according to the present invention further includes an image engine interface 112 optionally in communication with the processor 116 and an image engine 110 more fully described with respect to FIG. 3. The image engine 110 includes a host interface 140 or camera sensor interface port configured to communicate with the image engine interface 112 of the host/platform PDT 109 such that the image engine interface 112 is configured to receive the host interface 140 of the image engine 110. The host interface 140 is configured to send signals such as pixel data utilizing, for example, an I2C bus 141, and receive signals from the host processor 116 such as illumination and aimer control signals. The received signals can be communicated to an engine microcontroller 144 which processes the signals to control the illumination 143 and aimer 156 assemblies. Specifically, the optional microcontroller 144, in combination with the host processor 116 and through the host 140 and image engine 112 interfaces, causes the illumination assembly 143, including at least one light source, such as one or more LEDs configured to emit light in the near-infrared range and/or the visible range, green LED(s), and/or a laser diode, and the aimer assembly 156 to direct light through illumination and aiming optics 158, such as a lens plate, in the direction of a target, such as a bar code, for example. The emitted light is then reflected by the target through an imaging lens 144 onto an imager 142 of the image engine 110 such as a 2D image sensor such as a CCD, CMOS, NMOS, PMOS, CID, or CMD solid state image sensor, the imager 142 being configured to receive an image of the target and generate an electric output signal indicative of the data optically encoded therein. Output signal(s) transmitted by the imager 142 are then sent using an I2C bus 141, for example, through the host interface 140 to the image engine interface 112 of the host/platform PDT 109. Both of the host/platform PDT 109 and the image engine 110 receive power from a power supply 128, such as one or more batteries and/or circuitry for receiving an alternating current, the power to the image engine 110 being transmitted through the image engine interface 112 to the host interface 140 and, in one embodiment, along lines 146 and 148 to the imager 142 and the engine microcontroller 144, respectively. The host/platform PDT 109 and image engine 110 structures shown in FIGS. 2 and 3 are preferably supported on one or more printed circuit boards (not shown).

Figure 4:
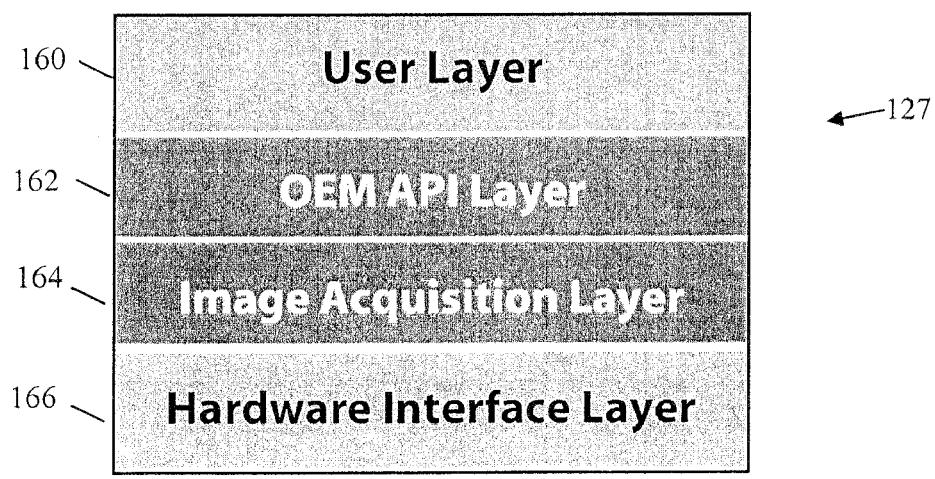
FIG. 4 is a diagram of exemplary software system control layers according to the present invention.

In order for the processor 116 to control the operation of the PDT 109, including specifically the image engine 110, the processor 116 implements program instructions it retrieves from the data storage means 122. The data storage means 122 generally stores program instructions that together comprise the operating system 123 as well as program instructions that together comprise the image engine control architecture 127, among other instructions and/or applications. The image engine control architecture 127 is shown in FIG. 4 as comprising a user applications layer 160, OEM API layer 162, image acquisition or scan driver layer 164 and a hardware interface or hardware device driver layer 166.

The hardware device driver layer 166 comprises program instructions that, when implemented by the processor 166, communicate directly with and handle physical control of hardware components. The device drivers 166 collectively function to abstract the low-level hardware control interactions such that an application 160, for example, the operating system 123, can interact with a hardware device in a predefined way irrespective of the specific details of the instructions that the hardware was designed to understand and/or the method/form by which data/signals are sent from the hardware device. Accordingly, the device driver layer 166 is typically designed by the host/platform PDT 109 designer/developer to function in accordance with the initially-installed components including, for example, a general purpose camera 108. For example, the device driver layer 166 may have a general purpose camera 108 driver that provides power to and/or initializes the camera 108, provides low level instructions to the camera 108 such as illumination level/type for example, receives pixel data from the image sensor of the camera 108, and stores the pixel data in an image buffer. With respect to the image engine 110, generally the device driver layer 166 communicates with the imager timing functionality, controls low level interrupt service, controls DMA initialization and control and controls illumination functionality, for example. The device driver layer 166 can be a dynamic link library as one exemplary implementation.

The image engine 110 of the present invention similarly has a scan driver 164 provided as the image acquisition layer 164 of the control architecture 127. The scan driver 164 provides a software interface to the imaging hardware/image engine 110. More specifically, the scan driver provides software callable routines for setting memory registers and supplying voltage to pins used to control the image engine 110 hardware. The scan driver 164 may, for example, provide routines that turn illumination on or off, turn an aimer on or off, initiate image capture, retrieve an image, auto-detect the imager, initialize the imager, perform state management, and perform exposure control. The scan driver 164 generally maintains the state and control of the imager, processes requests for images, and executes configuration and control requests. One example implementation of this layer is as a stream device driver to be used by the API 162.

The API 162 extends use of the scan driver 164 by providing a set of routines/a library, including naming and calling conventions and specifications for data structures, etc., which can essentially collect and order a set of lower level scan driver 164 commands to accomplish a function. The API 162 can be provided, for example, in the form of a dynamic link library.

The user layer 160 of the image engine control architecture 127 can be the host/platform PDT's 109 operating system 123 or any other host/platform PDT 109 designer/developer application 160 that accesses the image engine 110 by using function calls identified by the API 162. The user layer 160 is further removed from the low level functioning of the hardware and device drivers 164, 166.

Upon integration of an image engine 110 (and scan driver 164 and API 162) into a host PDT 109, rather than inefficiently and expensively duplicate significant hardware structures, the image engine 110 can share system resources such as data storage means/memory buffers for storage of acquired pixel data/imager output signals, control and data bus signal lines, the processor 116 specifically in the embodiment wherein a microcontroller 142 is not included in the image engine 110, and other system hardware components as included by the host/platform PDT 109 designer developer, for example. However, the sharing of resources causes contention issues particularly between an image engine 110 and a general purpose camera 108 provided on the host/platform PDT 109. As one specific example, when prompted by a trigger/scan button press, the scan driver 164 acquires memory buffers for physical storage of the image data being acquired. In the case in which the general purpose camera is subsequently utilized, for example by another button press, the memory buffer will not be available because it has been acquired but not yet released by the image engine even if the image engine 110 is no longer being utilized by the user of the PDT 109.

Accordingly, the present invention, as described in more detail below, can utilize a multiplexer 113 to select input (e.g. pixel data to be stored in a memory buffer) from one imager 110/camera 108 among many. The multiplexer 113 of the present invention is a logic entity and can be a dedicated integrated circuit or can be control logic implemented on the host/platform processor. In order to appropriately signal the multiplexer/control logic and effectuate a release or acquisition of a system resource a novel software solution has been designed as described in detail below.

In order to manage control of system resources, the scan driver 164 software defines a data structure that is instantiated and assigned a default value upon the calling of a function defined in the scan driver 164 such as an oemConnect or PowerOnImager function, the function names being exemplary and otherwise irrelevant to the invention. Upon the calling of another function defined in the scan driver 164 such as an oemDisconnect or PowerOffImager function, the function names again being irrelevant, the value of the data structure previously instantiated is modified to reflect a release of at least some of the system resources. The functions are defined in the scan driver 164 but serviced in the low level device driver layer 166 because the device driver 166 is configured to control the hardware. Accordingly, upon modification (instantiation and assigning of a default value or modification of the value of the data structure) the scan driver 164 calls a function in the device driver 166, that the host/platform PDT 109 designer/developer has implemented, according to specifications provided by the OEM image engine manufacturer, to set the appropriate pin of the host interface 140 (and in turn the image engine interface 112) connecting the interface 112 to the selector input of the multiplexer 113, to allow access to the system resource 138 by the image engine 110. Although the shared system resource is shown as the system bus 138 in FIG. 2, in other embodiments other system resources, as examples are identified above, can be shared using the apparatus and methods described herein.

In one embodiment, the data structure is a bool and the bool is instantiated during an initialization or power-up function call. As a part of this initialization or power-up function call, the bool is set to a default value such as true or 1. The data structure instantiation is necessary because the implementation of the device driver 166 is not carried out by the OEM of the image engine 110 and designer of the scan driver 164. Accordingly, in order to appropriately set, or provide the appropriate voltage to, the pin(s) of an interface (e.g. the host interface 140 and/or the image engine interface 112) to the host/platform PDT 109, the host/platform developer only needs the knowledge that a data structure/variable/bool will exist and have a value (e.g. true) when the image engine 110 is requesting a resource and, further, that the data structure will be passed through a function call to the device driver 166 as the name and parameters are predefined by the OEM in the scan driver 164 and/or API 162.

Accordingly, the manufacturer of the image engine (OEM) effectuates acquisition of a system resource by using an initialization or power-up function in the scan driver 164 to call a function in the device driver 166, previously identified by the OEM and which the OEM has predefined as taking in a parameter of the data structure type (e.g. bool), and the implementation details of the device driver 166 function are left to the host/platform PDT 109 designer/developer. However, in operation and as specified by the OEM and implemented by the host/platform 109 designer/developer, the device driver 166 function call operates to set a pin of at least one interface, the pin being in communication with the selector input of a multiplexer 113. Similarly, release of a system resource is effectuated by a power-down function in the scan driver 164 implemented by the OEM to modify the value of the data structure and call the function in the device driver 166 previously described above which passes the data structure to the device driver 166 where its value is used by the device driver to set the appropriate pin of the host 140 and/or image engine 112 interface as implemented by the host/platform PDT 109 designer/developer.

Accordingly, as is well known in the art, the multiplexer has as input for each of the imagers/cameras of the system as well $\log_2(N)$ selector inputs where N is the total number of imager/camera inputs. Although the data structure has been described as being a bool, the data structure can be any number of data types including integer, float or char, for example, or a reference or pointer as is known in the art. Accordingly, a more robust data structure can allow for the passage of more information to the device 166 driver such as state information of the image engine 110 and/or priority data. Even further, priority logic can be disposed between the image engine interface 112 and the general purpose camera 108 and the multiplexer 113 such that one of the image engine 110 or the general purpose camera 108 can be given priority access to a system resource. In this embodiment, an interrupt routine is provided in the scan driver 164 or device driver 166 in order to effectuate the saving of image engine 110 state and/or appropriate resumption of the image engine.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A system of sharing at least one system resource among a plurality of imagers of a portable data terminal, comprising:
a processor;
a multiplexer having a selection input;
at least one image engine in communication with an image engine interface having a plurality of pins wherein at least one pin is in communication with the multiplexer; and
a data storage means, the data storage means comprising software including a scan driver and a device driver that when executed causes the processor to perform a method comprising:
instantiating a data structure having at least one data type and at least one value upon acquisition of a system resource and modifying at least one of the values of the data structure upon release of a system resource;
transferring at least one of the values of a data structure from a scan driver to a device driver;
providing a voltage to a pin of an image engine interface based on the value of the data structure;
communicating with the multiplexer based upon the value of the data structure in order to modify the selection input of the multiplexer.

2. The portable data terminal of claim 1 wherein the system resources are selected from the group consisting of at least one memory buffer, at least one control signal line, at least one bus signal lines, and at least one processor.

3. The portable data terminal of claim 1 wherein the imager is a solid state image sensor selected from the group consisting of a CCD, CMOS, NMOS, PMOS, CID, and CMD.

4. The portable data terminal of claim 1 further including at least one general purpose camera and at least one image engine interface, the image engine interface configured to communicate with the host interface of the image engine, the image engine interface having a plurality of pins.

5. The portable data terminal of claim 4 further including a multiplexer having at least three inputs, the inputs including an output signal from the image engine, an output signal from the general purpose camera, and a selection signal.

6. The portable data terminal of claim 5 wherein the device driver is configured to provide a voltage to at least one pin of the image engine interface, the pin being in communication with the selection signal of the multiplexer.

7. The portable data terminal of claim 1 wherein the program instructions further include at least one of an operating system, an application, and an API.

8. The portable data terminal of claim 1 wherein at least one of the data types of the data structure is a bool.

9. The portable data terminal of claim 1 wherein the scan driver further includes an initialization routine configured to initialize the image engine wherein the initialization routine is further configured to instantiate the data structure and assign the data structure a value and a power-down routine configured to modify the value of the data structure.

10. The system of claim 1 wherein the plurality of imagers is at least one image engine and at least one general purpose camera.

11. The system of claim 1 wherein the at least one system resource is selected from the group consisting of at least one memory buffer, at least one control signal line, at least one bus signal lines, and at least one processor.

12. The system of claim 1 wherein the data storage means comprising software furthers include at least one of an operating system, an application, and an API.

13. A method of sharing at least one system resource among a plurality of imagers of a portable data terminal, comprising:

providing a processor providing a multiplexer having a selection input;

instantiating a data structure having at least one data type and at least one value upon acquisition of a system resource and modifying at least one of the values of the data structure upon release of a system resource;

transferring at least one of the values of a data structure from a scan driver to a device driver;

providing a voltage to a pin of an image engine interface based on the value of the data structure;

communicating with the multiplexer based upon the value of the data structure in order to modify the selection input of the multiplexer.

* * * * *